Dec. 31, 1968   B. F. QUINTILIAN ET AL   3,418,792
MODULAR COLLECTOR ELECTRODE FOR ELECTROSTATIC PRECIPITATORS
Filed June 26, 1967
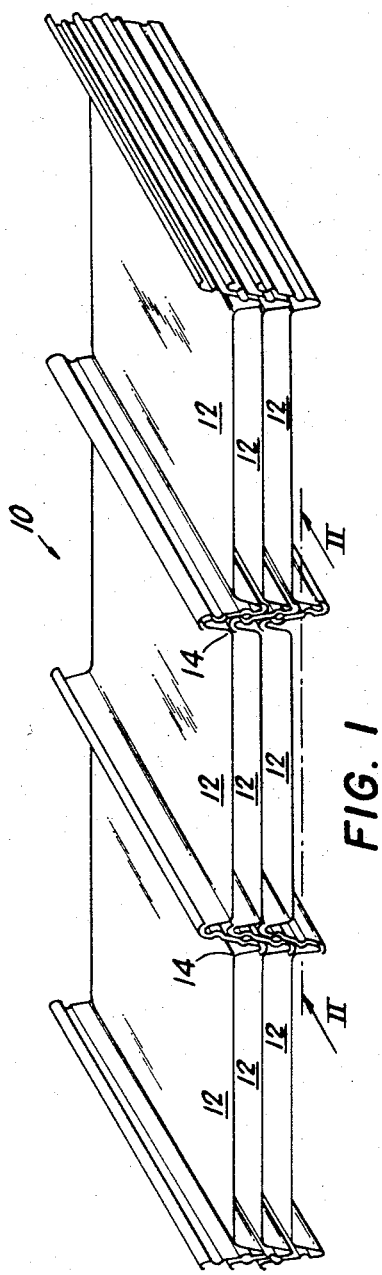
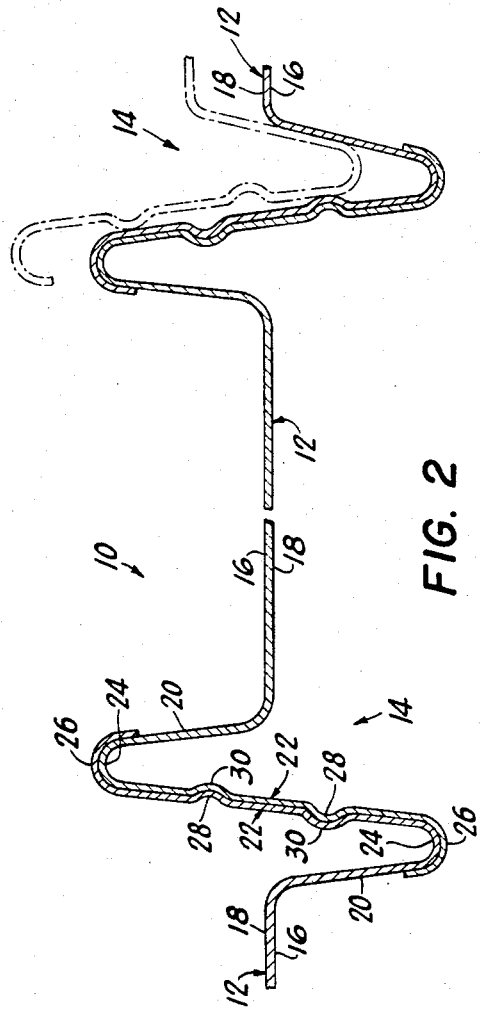
INVENTORS
BARTHOLOMEW F. QUINTILIAN &
ROBERT J. W. WILLIAMS
BY Boyce C. Dent
their Attorney

United States Patent Office 3,418,792
Patented Dec. 31, 1968

3,418,792
MODULAR COLLECTOR ELECTRODE FOR ELECTROSTATIC PRECIPITATORS
Bartholomew F. Quintilian, Baltimore, and Robert J. W. Williams, Lutherville, Md., assignors to Koppers Company, Inc., a corporation of Delaware
Filed June 26, 1967, Ser. No. 648,549
4 Claims. (Cl. 55—156)

ABSTRACT OF THE DISCLOSURE

A modular collector electrode for electrostatic precipitators having integral connections formed therein for joining the modules along ther lateral edges comprising substantially identical interlocking connectons of which one half is formed in the lateral edges of each module which can be snapped into place to form a continuous collector electrode, the interlocking connections preferably having a first flange portion extending at an angle from one side of a the module and a second flange portion extending in the opposite direction at an angle from the first flange portion to the other side of the module, the second flanges each having complementary male and female detent beads formed therein, with the modules being interdigitally reversed to align the half connections to form a complete interlocking connection.

CROSS REFERENCES TO RELATED APPLICATIONS

This invention relates generally to the modular electrode structure disclosed in co-pending application Ser. No. 648,578 filed on June 26, 1967, by Walter A. Baxter entitled, "Modular Collector Electrode for Electrostatic Precipitators," and assigned to the assignee of the present invention.

BACKGROUND OF THE INVENTION

Field of the invention

This invention relates generally to gas separation devices such as electrostatic precipitators and particularly to a unitized or modular assembly forming a collector electrode for electrostatic precipitators.

Description of the prior art

Collecting electrodes for electrostatic precipitators are usually hung from supporting structure in the precipitator shell in a manner to permit vibrating or rapping of the electrodes to dislodge collection dust. Since the horizontal lanes of the precipitator formed by parallel spaced electrodes may be quite long, the electrodes are usually made in sections which hang side by side. The lateral adjoining edges of the sections need not be connected although joining them to form a continuous plate-type structure is usually preferred. Joining the plates provides the advantage of stiffening them and, if so designed, provides a baffle projecting into the gas stream to retard re-entrainment of collected dust caused by the flow of gas past the surface of the plates.

Collector plates are conventionally joined in several ways, for example, by butting the edges and providing an overlapping doubler strip bolted or welded to the plates. A right-angle flange formed on the abutting edges may be welded, bolted or crimped together. In some instances, the right-angle flange may take the form of an angle iron welded to the plate with the abutting flanges bolted together. Another variation provides an angular projection formed in the plate having a leg which overlaps and is welded to a similar leg in the adjoining plate as shown, for example, in Byerly Patent 2,826,262. Some of the aforementioned connections require additional joining components such as plates, angle-irons, bolts and the like. Others require welding or crimping.

SUMMARY OF THE INVENTION

Accordingly, an object of the present invention is to provide a collector electrode structure formed by joining a plurality of modules having interlocking connections integrally formed in the lateral edges thereof to provide both stiffening for the electrode and baffles projecting into the gas stream, and providing easy assembly. In the preferred form of the invention, each module of the collector electrode has one half of an interlocking connection formed on each lateral edge for connection with a corresponding half connection on adjacent modules. Each half connection is preferably in the form of a first flange portion formed slightly less than perpendicular to one side of the module and then formed in the reverse direction to form a second flange extending beyond the plane of the module a like distance on the other side of the module. The edge of the second flange portion terminates in an open bead portion. Thus, with the modules reversed interdigitally, each half connection nests within the one on the adjacent module. Male and female detent beads are formed in the second flange portion of each half connection for interlocking with corresponding detents in the adjacent second flange portion. In this manner, there is provided an interlocking connection which requires no crimping, welding or additional parts such as angles or bolts. The flange portions provide stiffening for the electrode structure so that thinner gauge plate material can be used. The flange portions also serve as projections into the gas stream to retard re-entrainment of collected dust particles.

Another advantageous feature is that interlocking the modules substantially continuously along their edges results in a more homogenous structure. This contributes to the effectiveness of localized rapping since the vibrational energy will be more evenly distributed throughout the electrode assembly with little or no loss of energy through the interlocking connections.

Another advantage is that the portion of the interlocking connection projecting into the gas stream has a smooth rounded profile rather than angular and sharp. Because of this, the concentration of electric field force lines is reduced thereby permitting the application of higher voltages to the discharge electrodes without undue sparking.

An additional feature is provided by the configuration of the connection permitting stacking of assembled electrode structures on top of one another at a greater density and having a greater package strength which is desirable for shipping purposes.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

BRIEF DESCRIPTIONS OF THE DRAWINGS

In the drawings wherein like parts are marked alike:
FIGURE 1 is an isometric view of a portion of a stack of electrode assemblies illustrating schematically the manner by which the electrodes may be stacked for shipment;
FIGURE 2 is a cross-sectional view taken along line II—II of FIGURE 1 of a portion of an electrode assembly illustrating the preferred form of the interlocking connection;

DESCRIPTION OF THE PREFERRED EMBODIMENT

Figure 3:
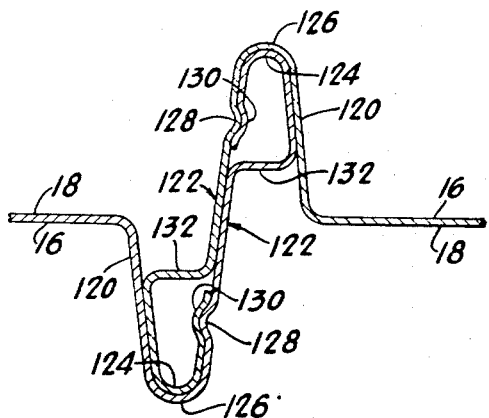
FIGURE 3 is a cross-sectional view of a portion of an electrode assembly illustrating an alternate form of the interlocking connection.

Referring now to FIGURE 2, there is illustrated a portion of an electrode assembly generally designated by numeral 10 comprising a pair of modules 12 interconnected along their lateral edges by an interlocking connection 14. Modules 12 have collecting surfaces 16 and 18 which surfaces are interdigitally reversed as illustrated so that one half of connection 14 may be identical on each module 12.

Each half connection comprises a leg or flange 20 formed at an angle to surface 16 and a leg 22 formed by a reverse bend 24 in leg 20. Leg 22 extends at an angle to leg 20 and projects through the plane of the module and beyond surface 18 for a distance substantially equal to the extension of leg 20 from surface 16. Leg 22 terminates in a reverse bend 26 as illustrated.

The half connection in the adjacent modules are made identical to the one just described. Since the modules are reversed, one half connection fits within the other as illustrated. Reverse bends 24 and 26 are formed so that bend 24 nests within bend 26.

To interlock the half connections, a pair of similar detent beads 28 and 30 are formed in leg 22, spaced apart as shown, and preferably extending the full length of the module. The detent 28 in the leg 22 of one module nests in detent 30 of the adjacent module. Thus, it can be seen that the detents 28, 30 maintain the connection between the nesting legs 20, 22 of adjacent modules.

The dotted lines in FIGURE 2 illustrate the relative position of two of the modules just prior to assembly. As the module illustrated in dotted lines is moved toward the interlocked position, the legs 20, 22 of each half connection are squeezed together and when the detents 28, 30 are aligned, the legs again spread apart thereby exerting a spring force against each other which maintains the interlocking connection.

The half connections may be joined by placing the modules on a flat surface and forcing them together such as by passing the connections between a pair of rolls. If preferred, the modules may be left stationary and the joining rolls passed along the connection. They may also be joined by pressing a bar against the joints with hydraulic rams or the like.

The angle formed by the intersection of legs 20, 22 is preferably about 12 degrees, that is, each leg is at an angle of about 6 degrees from a line perpendicular to surfaces 16, 18. It should be understood, however, that this angle may vary widely without appreciably detracting from the effectiveness of the connection.

Although two detents 28, 30 are preferred, one or several may be used as desired. The reverse bend 26 need not terminate as shown in FIGURE 2 but may continue towards surface 16 a greater distance. While one advantage of the invention is to obviate the need for fasteners such as bolts or welding, either may be used to further secure the connection so that it is merely used as a means of providing projecting baffles into the gas stream.

Even though the shape of the half connections may be formed on a press brake, they lend themselves well to roll-forming. Such forming is quite economical since the modules may be formed in a continuous length from a coil of steel and cut off at the desired length.

Another advantage accruing from the configuration of FIGURE 2 is that a plurality of electrode assemblies may be stacked as illustrated in FIGURE 1. The reverse bends 26 of one assembly can nest within the corresponding bends of another assembly so that the overall height of a stack of electrodes is less than if the projections were required to rest on the collecting surfaces. Thus, the area required for shipment is smaller and less costly. Although FIGURE 1 shows only three modules assembled as a complete electrode, more or less can be used as desired.

Figure 4:
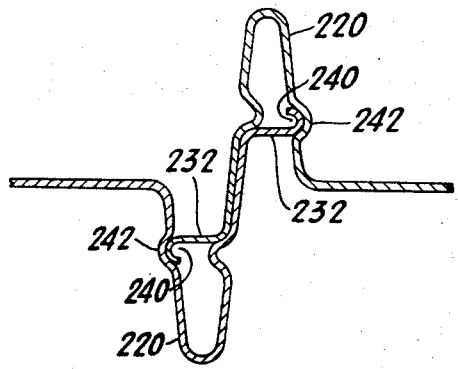
FIGURE 4 is a cross-sectional view of a portion of an electrode assembly illustrating another alternate form of the interlocking connection.
Figure 5:
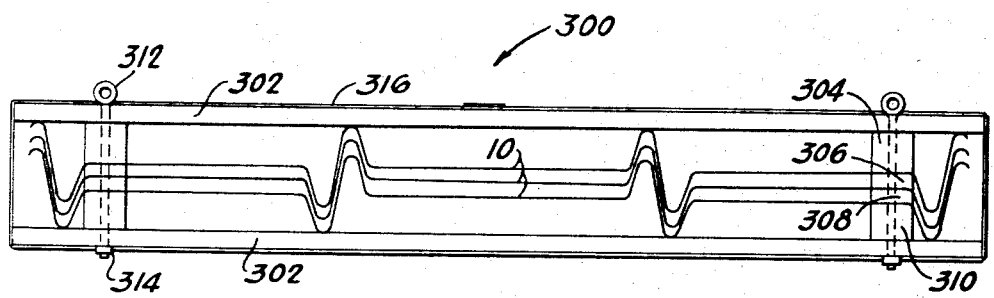
FIGURE 5 is an end view of a package of electrode assemblies illustrating schematically the nesting of the electrodes to form a shipping package.

Any one of the embodiments of FIGURES 2, 3 and 4 will nest in a similar manner. Because of this, a shipping package 300 can be formed as schematically illustrated in FIGURE 5. Although only three electrode assemblies 10 are shown in the package, more or less may be contained therein. To form the package 300, the assemblies 10 are nested in a stack as shown. Cross-slats 302 are provided above and beneath the stack extending across the width of the electrodes at both ends of the stack to stiffen the package across its width. Spacer slats 304, 306, 308 and 310 are preferably positioned respectively between the cross-slats 302 and the electrodes near both lateral edges of the stack and preferably extending the length of the stack. Eye-bolts 312 are passed through holes provided in the four intersections of the cross-slats and the spacers and secured by nuts 314. The eye-bolts fasten and draw the package together and provide a means for connecting crane hooks for handling the package. The spacer slats prevent crushing of the interlocking connections 14 when the package is drawn together by the eyebolts. If preferred, conventional steel strapping 316 may also be provided around the cross-slats 302 to further secure the assembly. In this manner, the electrodes 10 can be shipped in a package of greater density which is structurally sound and easily handled.

The embodiment of FIGURE 3 utilizes the same principles as described for the preferred embodiment of FIGURE 2. In this form a leg 120 is formed at an angle to surface 16 and a leg 122 is formed by a reverse bend 124 in leg 120. Leg 122 extends beyond surface 18 of the module and is then formed into a portion 132 parallel with surface 18 at a distance to meet leg 120 of an adjacent module. Thereafter, it continues along leg 120 of the adjacent plate and around reverse bend 124 and then along leg 122 of the adjacent plate and finally terminating in a detent bead 130 cooperating with a detent bead 128 in the adjacent leg 122. Parallel portion 132 serves to block off the interior depth formed by legs 120, 122 so that dust is less likely to become lodged therein. Parallel portion 132 also serves as a buttress for the nested connections when the assemblies are formed in a package.

The embodiment of FIGURE 4 is similar to that of FIGURE 3 except that parallel portion 232, corresponding to parallel portion 132, terminates in a detent bead 240 which nests in a cooperating detent bead 242 in leg 220 of the adjacent module. This configuration serves the same purpose as the one of FIGURE 3 and is somewhat simpler to make.

Any one of the foregoing embodiments provides an economical interlocking connection for collector electrode modules which is easily made and assembled and requires less parts than conventional electrode assemblies.

The mating convolutions forming the interlocking connections are preferably spaced along the width of the electrode structure in a particular proportion to the lane width, that is, the distance between adjacent electrode assemblies. Furthermore, the distance that the interlocking connections project into the gas stream from both collecting surfaces is preferably of a particularly proportion relative to the lane width. The proportion found to be most advantageous for the connection spacing is from 1S to 3S, where S equals the line width. The proportion for the connection projection is from 0.1S to 0.3S. For example, the optimum spacing for both connection spacing and projection falls in the middle of the range. Thus, where the lane width S is 10 inches, the connection spacing should be 20 inches and the connection projection should be 2 inches.

It has been found that these proportions yield the best collection performance since a quiescent zone is formed near the collecting surface between the projecting convolutions. Thus, when the electrodes are rapped, there is less tendency for the collected dust particles to become re-entrained in the gas stream. If the spacing varies more or less than 3S to 1S, apparently eddy currents are produced in the gas which tend to trap particles dislodged during rapping. Similarly, if the height of the convolutions varies more or less than 0.3S to 0.1S, the same result occurs.

Having thus described the invention in its best embodiment and mode of operation, what is desired to be claimed by Letters Patent is:

We claim:

1. An electrostatic precipitator modular electrode structure, comprising:
   substantially identical first and second modules having substantially planar web portions lying in a common plane, each web portion having a first face on one side of said structure and a second face on the opposite side of said structure;
   interlocking means providing a snap-in connection for joining the lateral edges of said modules to form said modular structure,
   said interlocking means including a convoluted half-connection formed in the lateral edge of said first module and having a first leg projecting beyond said first face and a second leg joined to said first leg and projecting beyond said second face,
   said interlocking means further including a convoluted half-connection formed in the lateral edge of said second module and having a first leg projecting beyond said second face and a second leg joined to said first leg and projecting beyond said first face,
   whereby each convoluted half-connection forms a mirror-image of the other half-connection for mating engagement therewith; and
   mating male and female detent means formed in at least one of said legs of each half-connection for maintaining said half-connections in interlocking engagement.

2. The modular electrode structure of claim 1 wherein:
   said first and second legs in the half-connection of said first module form an open convolution spaced from said first face,
   and wherein said first and second legs in the half-connection of said second module form an open convolution spaced from said second face,
   said second legs of each half-connection terminating in a reverse bend for overlapping the open convolution of the respective half-connections.

3. The modular electrode structure of claim 1 wherein:
   said first and second legs in the half-connection of said first module form an open convolution spaced from said first face,
   and wherein said first and second legs in the half-connection of said second module form an open convolution spaced from said second face,
   said second legs of each half-connection terminating in a substantially closed convolution adapted for interlocking engagement within the open convolutions of the respective half-connections.

4. The modular electrode structure of claim 1 wherein:
   said first and second legs in the half-connection of said first module form an open convolution spaced from said first face,
   and wherein said first and second legs in the half-connection of said second module form an open convolution spaced from said second face,
   said second legs of each half-connection terminating substantially midway between said web portions and said open convolutions, said second legs including a tip portion coplanar with said web portions and extending between the first and second leg portions of the respective open convolutions to form a closed convolution therewith.

References Cited

UNITED STATES PATENTS

| | | | |
|---|---|---|---|
| 95,732 | 10/1869 | Roys | 52—522 |
| 425,002 | 4/1890 | Sagendorph | 52—528 |
| 440,009 | 11/1890 | Caldwell | 206—60 |
| 993,281 | 5/1911 | Todd | 52—522 |
| 1,133,387 | 3/1915 | McCarty | 206—65 |
| 1,156,053 | 10/1915 | Brown | 52—522 |
| 1,345,790 | 7/1920 | Lodge | 55—129 X |
| 1,920,837 | 8/1933 | Birdsey | 206—60 |
| 1,976,968 | 10/1934 | Sheldon | 52—522 |
| 2,302,949 | 11/1942 | Palmer | 52—630 X |
| 3,282,029 | 11/1966 | Stevernagel | 55—154 X |
| 3,290,850 | 12/1966 | Byrne et al. | 52—630 |
| 3,295,176 | 1/1967 | Bright | 24—20 |
| 3,303,627 | 2/1967 | Mora | 287—189.36 X |

FOREIGN PATENTS

| | | |
|---|---|---|
| 478,377 | 6/1929 | Germany. |
| 768,988 | 2/1957 | Great Britain. |
| 769,527 | 3/1957 | Great Britain. |
| 937,925 | 9/1963 | Great Britain. |

OTHER REFERENCES

German printed application (B) No. 1,117,287, printed November 1961.

Netherlands printed application (A) No. 288,724, printed March 1965.

HARRY B. THORNTON, *Primary Examiner.*

D. E. TALBERT, *Assistant Examiner.*

U.S. Cl. X.R.

52—522; 206—60, 65; 29—453